Aug. 5, 1958   W. R. SATTERFIELD   2,846,324
REFRACTORY AND METHOD
Filed May 14, 1954

INVENTOR
Walter R. Satterfield
BY
HIS ATTORNEY

United States Patent Office 2,846,324
Patented Aug. 5, 1958

2,846,324

REFRACTORY AND METHOD

Walter R. Satterfield, Baltimore, Md., assignor to Armco Steel Corporation, a corporation of Ohio Application May 14, 1954, Serial No. 429,841

5 Claims. (Cl. 106—44)

My invention relates in general to the welding or cladding of metal products, and more particularly concerns a method of producing a refractory retaining form for use in the welding or cladding operation, and as well it concerns the retaining form itself.

An important object of my invention is to provide a method of welding highly refractory, comparatively costly alloy metals at strategic point or points onto comparatively low cost base stock, giving welds which are sound and durable, and which are characterized by substantial absence of porosity or nonmetallic oxide inclusions, all with adequate ratio of weld metal to base metal with even and uniform weld line, and with minimum expenditure of operational time, equipment and labor.

Another object is to provide a cup or other refractory or ceramic form which is particularly adapted for the support in suitable manner of metal products during the provision thereon of a hard facing or clad surface and which, during such treatment, adequately provides suitable welding atmosphere, insuring that the metal be properly "wetted," and that requisite atmosphere turbulence be created, sufficient that the clad metal while in molten form will adhere firmly and tenaciously to the base metal surface; which cup adequately resists thermal shock, possesses suitable thermal expansion characteristics, and during repeated successive welding operations is relatively immune to any tendency to soften in use, to evolve gases, or to sublime or otherwise lose shape or size while in service, and which, during welding operation, will not erode to any appreciable extent under gas attack; and which permits ready viewing, and leaves relatively unobscured, the "sweating" of the metal surface undergoing treatment, a signal, important to the operator, that the base metal surface is ready for the addition of the cladding alloy.

Other objects of my invention in part will be apparent from the description which follows and in part more particularly pointed out hereinafter. Accordingly, my invention resides in the several combinations of ingredients and composition of materials; in the various manipulative steps and the combnation of each of the same with one or more of the others; and in the product had, the scope of the application of all of which is more fully set forth in the claims at the end of this description.

Figure 1:
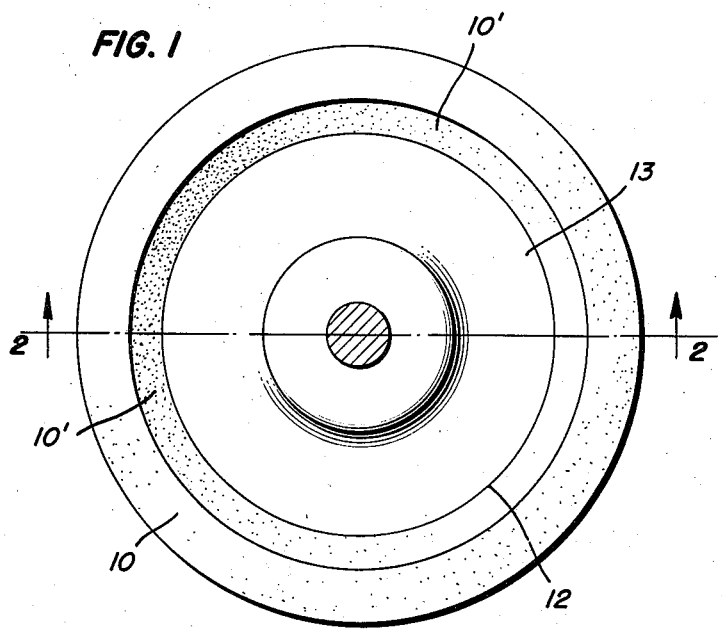
Figure 2:
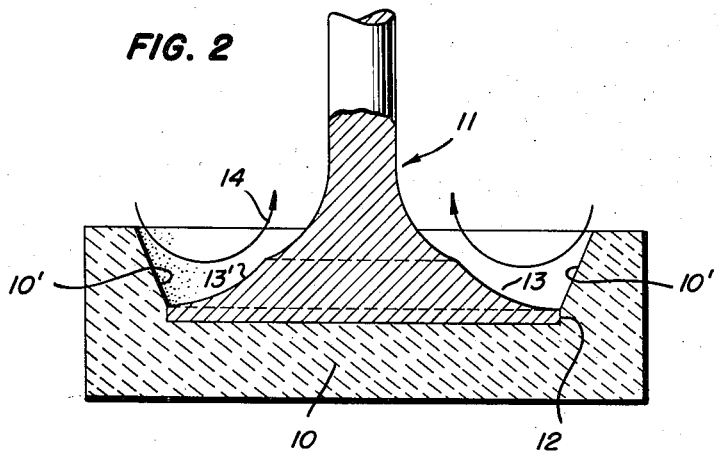

In the drawing wherein certain phases of the application of my invention is illustratively disclosed, Fig. 1 is a plan view and Fig. 2 a fragmentary sectional elevation of a refractory cup according to the practice of my invention and in which an internal combustion engine exhaust valve is positioned for the application thereto of cladding metal.

As conducive to a more ready understanding of my invention it should be noted at this point that the practice has arisen of facing or cladding the base metal stock of articles such as internal combustion engines or exhaust valves in the region subjected to severe operating conditions by applying to the base metal of the valve a hard face of alloy metal. And in facing such valves, and to provide satisfactory welding atmosphere, the practice has sometimes arisen of providing a retaining form of refractory material to support the article undergoing such facing operation. Not only does this retaining form serve as a physical support for the base metal stock but as well, it conduces towards a suitable climate for the welding operation.

Illustratively, in the production of exhaust valves for internal combustion engines valves formed of Armco 21–4 N steels (21% chromium, 9% manganese, 4% nickel, .4% nitrogen, balance—iron) are clad with Stellite F (36% cobalt, 24% chromium, 12% tungsten, under 1% iron, 1.25% silicon, 1.6% carbon and 24% nickel). The base metal is high in both chromium and manganese. And when the cladding operation is performed through the use of the well-known semi-automatic oxy-acetylene welding machine, it is customary to employ a retaining cup to hold the valve while the welding operation is performed. Since this operation is conducted at extremely high temperatures, this cup usually is of refractory material. And as I have pointed out, this cup serves not only to provide physical support for the valve and to hold it in proper welding position, but as well it helps to retain the heat which is imparted to the metal through the oxy-acetylene welding torches.

In the past, and before it became necessary to conduct the welding operation at extremely high temperatures, a number of chemical compositions adequately responded to and satisfied the physical and chemical requirements of the refractory cup. Illustratively, a typical refractory material, commercially available and satisfying the needs of the industry as heretofore existing, had the following general composition: 15% silicon carbide, 20% blue clay binder, and the balance essentially all aluminum oxide.

And while refractory forms responding to the foregoing general composition have proved entirely satisfactory for treatment of alloy steels of the general compositions heretofore employed, they are not satisfactory for the special alloys which recently have been developed for applications which require exceptionally high resistance to heat. Typical of those new alloys of steel may be listed: Armco 21–4 N, identified above, and 21–3 N (21% chromium, 9% manganese, 3% nickel, .3% nitrogen, and remainder iron). And it has been amply demonstrated that as contrasted with the older and less highly alloyed types of metals, these high-chromium and high-manganese alloys are substantially more difficult to weld by the oxy-acetylene process. For not only must a substantially greater quantity of heat be imparted into the welding system, but as well, the oxide coating which appears on the surface of these newer alloys during the torch-welding process is especially impervious, which enhances the difficulties encountered.

Therefore, one of the objects of my invention is to provide a special composition for the production of the ceramic cups; a composition which resists the high temperatures involved without fluxing or otherwise reacting with the materials undergoing treatment; and which is so reliable as to ensure successfully hard-facing this new type of heat-resisting alloys or stainless steels even where the welding operation is conducted in a repetitive and cyclic manner, as through the use of a semi-automatic or fully automatic oxy-acetylene welding machine.

Referring now to the practice of my invention, my investigations disclose that all materials must be omitted from the refractory cup composition which have the effect of either softening the composition or lowering the fusion temperature of the ceramic article in its final or fabricated form. From a fundamental chemical standpoint, therefore, and to be satisfactory, such a ceramic composition must have little if any silicon dioxide and substances generally similar in effect, such as iron oxides, calcium oxides, sodium and potassium oxides, phosphorous and boron derivatives. In short, no material should be present in the composition exerting an undesirable chemical fluxing action in the final product.

I have found, however, that there are a number of refractory materials which are commercially available, satisfying the requirements for the refractory cup and which at the same time are of requisite purity, are relatively inert, and display high melting points. Illustratively, aluminum oxide or Alundum is satisfactory for this purpose. From a physical or mechanical standpoint, however, it is necessary to compound this basic refractory substance with other materials, and this in controlled manner, to achieve successful fabrication of the composition into a ceramic product of proper shape, such as cup-like or other required form.

While from an ideal standpoint pure aluminum oxide would be the material most desired in the composition, practical limitations in both the fabrication pressures and firing temperatures and the like, necessitate the inclusion of small quantities of silicon dioxide and magnesium oxide properly to bond the basic refractory. Provided the components thereof are kept within required composition limits, I find that an $Al_2O_3$—MgO—$SiO_2$ ternary system satisfies the foregoing special requirements of a suitable ceramic composition. The composition limits are critical.

I find that satisfactory results can be achieved and fabrication practice maintained in convenient manner, provided the proportions of the ingredients be restricted to ternary systems having at least 60%—$Al_2O_3$, not more than about 30%—$SiO_2$ and the balance essentially all MgO; but preferably not more than about 30% MgO. Both the silicon dioxide and the magnesium oxide serve as binders for the aluminum oxide, but when the silicon dioxide content exceeds the critical value of about 30%, I find that the resulting ceramic system softens at too low a temperature and perhaps will become too vitreous, the product has too great a tendency to flux while in use and has too low a point at which melting starts, and the product is too brittle and glassy and will not resist thermal shock. When the magnesium oxide content exceeds about 30% by weight of the total material, the system has too high a coefficient of thermal expansion, and the required close tolerance can not be maintained between refractory form and the object which it supports. Moreover, such system displays too low a resistance to thermal shock and cracks or breaks with rapid temperature change.

When the ceramic is formed from a ternary system, the component ingredients of which are maintained within the percentage range specified, the resultant product has expansion characteristics insuring required close tolerances between the ceramic and the metal product which it carries. This is most important from a practical standpoint, as perhaps best illustrated in the case of an internal combustion engine valve. Here if the space between the valve and the cup is too great, then the alloy metal with which the valve is clad, while in molten form, will run down into the cup. However, if the space between the valve and the cup be too small, then the valve will expand against the cup and break it, and as well, will bind therein. I have found, in working with a ceramic according to my invention, that a tolerance of say 0.015 of an inch when cold, is entirely satisfactory for a 1½ inch valve.

I find that longer useful life is imparted to the refractory form, and particularly when subjected to the hardfacing operation referred to, if the proportions of the system discussed in the foregoing are still further restricted. Illustratively, a refractory form molded with an initial pressure of at least 300 pounds per square inch, and then fired at a temperature of at least 2350° F., exhibits maximum life when there is present at least 85% aluminum oxide, with not more than say about 15% silicon dioxide, and the balance substantially all magnesium oxide, this not more than about 15% by weight, to give a total of 100%.

In short, for the basic refractory material concerned, I find that the best compositions are those that chemically approach closest to the pure aluminum oxide, consistent with practical fabrication techniques presently available. This is particularly true, where as in the present case, aluminum oxide is the basic refractory material concerned.

In the refractory composition it is probable that the silicon dioxide imparts to the aluminum oxide system its major strength through the formation of mullite. The magnesium oxide probably serves as a flux, aiding mullitization; it lowers the softening point, and serves as a catalyst in aiding mullitization. However, I advance this solely as a possible explanation, and by no means intend to be bound thereby. Suffice it to say that practical experiments show that a composition responding to the general analysis given displays adequate properties. I find that it is comparatively immune to thermal shocks and high temperature deterioration, effectively resisting sudden temperature changes, ranging from about 300 to 400° F. up to the neighborhood of 2800° F. or more. And this is highly important where an air blast is used to cool the clad valve after facing, to facilitate removal, for this greatly increases the thermal shock which must be resisted by the cup.

I find it entirely possible to include small quantities of other ingredients in the ceramic molding composition in order to modify its properties, and this, with regard either to the finished cup, or to aid in the making of the cup. Illustratively, the addition of a small quantity of silicon carbide, up to 15%, tends to raise thermal conductivity of the resulting ceramic composition. Moreover, auxiliary binders may be included, to aid in the fabrication of the refractory form. But if auxiliary binders are employed, principally to impart to the refractory forms sufficient strength for handling during the fabricating steps from the molding stage through and including the high temperature firing stage, it is essential that excessive quantities of undesirable ingredients be kept out of the ceramic system. That is, and again by way of illustration, care must be taken to prevent the inclusion of excessive amounts of silicon dioxide, sodium oxide, potassium oxide, or phosphorous pentaoxide, or other similar undesirable ingredients. This effectively prohibits the use of clay and sodium silicates.

I have found, however, that any of the variety of organic resinous materials now commercially available will admirably serve as suitable auxiliary binders. Especially, I have found that thermo-setting resins of phenol-formaldehyde, urea-formaldehyde and melamine-formaldehyde; and the thermo-plastic resins of polyoxyethylene esters and polyoxypropylene esters are most suitable in fabricating the refractory articles which I employ. The amount of resin employed is in amounts up to 15% by weight of the whole.

As illustrative of the practice according to my invention, it is helpful at this point to consider a detailed example of molding composition which I have successfully used for the fabrication of refractory cups for the hardfacing of internal combustion engine exhaust valves formed of Armco 21–4 N base metal, and which are to be surface-clad with Stellite F. Such composition is fabricated by initial molding under pressure of about 500 p. s. i., thereupon dried at about 350° F. for a period of one hour, and then fired at about 2250° F. for about two hours. The composition by weight essentially comprises:

| | Percent |
|---|---|
| Aluminum oxide (100F)[1] | 71 |
| Magnesium oxide (100F) | 8 |
| Silicon dioxide | 2 |
| Silicon carbide (100F) | 11 |
| Liquid resin (phenolic type) | 6 |
| Water | 2 |

[1] 100 mesh or finer.

Where desired, the molding pressures may range from 300 p. s. i. to 5000 p. s. i.; the drying temperatures from 225° to 450° F.; and the firing temperatures from 2000° to 2450° F.

In the product thus formed, with the composition kneaded, shaped and formed in moist condition, subsequently dried, and fired under the conditions heretofore recited, the resultant refractory comprises a ceramic system in which the weight-ratio of $Al_2O_3:SiO_2:MgO$ is about 87.5:2.5:10.0. This ratio assumes that the silicon carbide inclusion is unchanged upon firing at 2250° F. Ceramic cups or other refractory forms made from this specific molding composition, so treated, are found to have about 12% silicon carbide distributed throughout the ternary basic ceramic system.

The welds produced in the Stellite-clad chromium-nickel-manganese stainless steel valves show no evidence of porosity. No non-metallic oxide inclusions are found under the microscope. Entirely adequate ratio of weld metal to base metal is observed. An even weld line is produced, with uniformity throughout the welding zone. The welds are sound and satisfactory.

Further experiments conducted with molding composition slightly different from those just described, more nearly suiting it to the fabricating techniques to be employed, respond to the following by weight:

| | Percent |
|---|---|
| Aluminum oxide (100F)[1] | 71 |
| Magnesium oxide (100F) | 8 |
| Silicon dioxide | 2 |
| Silicon carbide (100F) | 11 |
| Dry resin (urea-formaldehyde type) | 4 |
| Liquid resin (phenolic type) | 2 |
| Water | 2 |

[1] 100 mesh or finer.

Here, and with fabrication as with the first composition, the resin employed consists of about ⅓ of the liquid or phenolic type, and about ⅔ of the dry or urea-formaldehyde type. This comprises the major difference as compared with the first composition where only the phenolic type resin was employed. This second composition is successfully fabricated into ceramic welding cups, and these cups successfully employed in the production of Stellite F-clad automotive exhaust valves in which Armco 21-4 N is employed as the basic metal.

In still a third set of experiments, employing a composition of the following analysis:

| | Pounds | Percent |
|---|---|---|
| Aluminum Oxide (100F) | 18.0 | 69.3 |
| Magnesium Oxide (100F) | 1.7 | 6.5 |
| Silicon Dioxide | 0.3 | 1.2 |
| Silicon Carbide (100F) | 3.0 | 11.5 |
| Resin (Polyoxyethylene Glycol Ester) | 2.0 | 7.7 |
| Water | 1.0 | 3.8 |
| Total | 26.0 | 100.0 | the resulting composition was fabricated as above into cups suitable for Stellite F-cladding automotive exhaust valves. Having been initially molded in proper manner, dried and fired, the cups thus formed responded admirably to use in semi-automatic, oxy-acetylene welding machines, with the production of welds which were entirely satisfactory. And in making such cups I prefer the composition noted.

Illustratively, refractory cup 10 nicely receives valve 11 in the region of the valve head 12. The under surface 13 of the valve is received in the cup with nice fit relative thereto. A swirling action of the welding gas as indicated by arrow 14, is imparted by the correlation of the taper 10' (comprising the interior of the cup 10) with the concave under surface 13' of the valve 11.

Cups produced according to my invention have long useful life. Illustratively, where with the ceramic cup as heretofore known a life expectancy exists of only about 4 to 5 welding operations, my new cup may be satisfactorily employed in the production of at least 15 to 20 valves. It is interesting to note in this respect that failure of the cup or other ceramic form heretofore usually resulted from the ceramic material adhering to and casting off with the welded valve. And this results in damage to the valve. Quite to the contrary, my new composition results in a surface which has requisite porosity to resist thermal shock and yet resists all tendency of the molten cladding metal to penetrate the pores of the ceramic, either through surface tension or for other reasons. Such penetration is of course undesirable because of the variation thereby introduced into the composition of the clad metal. And this is distinguished sharply from the cups heretofore available where either the metal or the slag film forming on the metal reacts with the material of the cup and causes the valve to stick to the cup. Where the cup material sticks to the valve, this not only causes the cup to break when the valve is removed, but imparts roughness to the valve itself.

Failure of the prior art cups is due in part to the internal dimension thereof increasing to such an extent that the molten clad metal goes beneath the lip. This results in excessive dilution of the facing material. In my new cup this defect is avoided and avoidance contributes materially towards preservation of a proper ratio of clad metal to base metal.

My invention makes it possible to hard-face internal combustion engine exhaust valves and generally similar products employed in high temperature operation which are subjected to severe thermal shock and which employ alloy steel base metals with even more specialized alloy facings in the regions of extreme changes in quantity of heat and range of temperature. Not only does my new cup, or other refractory form, provide adequate physical support for the work, but as well it imparts a swirling action to the oxy-acetylene gases thereby insuring that the metals undergoing welding are effectively washed in a proper atmosphere, conducing to effective welding of the face material. My new ceramic product admirably resists gas erosion. Moreover, it displays all requisite immunity to thermal shock attending upon sudden heating and cooling, illustratively from about 300 to 400 degrees F. up to as high as 2800 degrees F. or more.

The desirable expansion characteristics displayed by my new ceramic insures requisite close tolerances between the valve and the cup which supports it. And this is most important from a practical standpoint. The new product does not melt, fuse, sublime or detrimentally soften in operation, nor does it emit objectionable gases while in service. It effectively retains its size and shape, even when subjected to repeated welding operations. Not only does my new ceramic product effectively resist chemical reaction with the oxide product of the welding operation, but, as well, effective and ready release of the finished valves of other products from the ceramic cup is had.

All the foregoing, as well as many other highly practical advantages attend upon the practice of my invention.

It is apparent from the foregoing that disclosure of my invention will readily suggest many embodiments thereof to those skilled in the art, and as well, many modifications of the present embodiment. Accordingly, I desire this disclosure to be considered as entirely illustrative and not by way of limitation.

I claim as my invention:

1. Composition for the production of highly refractory ceramic weld metal retaining products consisting essentially of aluminum oxide, magnesium oxide, silicon dioxide, silicon carbide and resin in intimate admixture in the proportions by weight of at least 60% aluminum oxide, about 6% to 30% magnesium oxide, about 1% to 30% silicon dioxide, up to about 15% silicon carbide, and about 2% to 15% resin selected from the group consisting of phenol-formaldehyde, urea-formaldehyde, melamine-formaldehyde, polyoxy ethylene esters, and polyoxy propylene esters.

2. A ceramic molding composition for making a cup-shaped form for retaining weld metal consisting essentially of, in approximate percentages by weight and in intimate admixture, finely divided particles, about 71% aluminum dioxide, about 8% magnesium oxide, about 2% silicon dioxide, about 11% silicon carbide, about 6% resin of phenolic type, and about 2% water.

3. The method of forming a cup-shaped refractory ceramic supporting form which comprises preparing a mixture consisting essentially of at least 60% aluminum oxide, silicon dioxide present in amounts up to about 30%, magnesium oxide present in amounts up to a maximum of about 30%, silicon carbide present in amounts up to about 12%, and a resinous binder present in amounts up to about 15% by weight of the entire composition; molding the same into proper shape and dimensions at a pressure of about 300 to 5000 p. s. i.; and then firing the same at about 2000° to 2450° F.

4. The method of providing a cup-shaped refractory ceramic composition comprising intimately admixing finely divided particles of aluminum oxide-magnesium oxide-silicon dioxide ternary composition of approximately 71% aluminum oxide, 6% to 8% magnesium oxide, 1% to 2% silicon dioxide, together with about 11% to 12% silicon carbide, about 6% to 8% resinous binder, and from 2% to 4% water; thereafter molding the same under pressure in the neighborhood of about 300 to 5000 p. s. i.; drying at about 350° F.; and then firing at about 2250° F.

5. A cup-shaped refractory ceramic supporting form for weld metal initially molded into cup-shape with bottom and upstanding sides at a pressure of about 300 to 5000 p. s. i. and then fired at about 2000° to 2450° F., in final form and by weight consisting essentially of at least about 60% aluminum oxide, silicon dioxide present in amounts up to a maximum of about 15%, silicon carbide present in amounts up to about 15%, and the balance essentially all magnesium oxide, this present in amounts up to a maximum of about 15%.

References Cited in the file of this patent

UNITED STATES PATENTS

| | | |
|---|---|---|
| 1,966,407 | Havman | July 10, 1934 |
| 1,966,408 | Havman | July 10, 1934 |
| 2,122,960 | Schwartzwalder | July 5, 1938 |
| 2,301,763 | Wagner | Nov. 10, 1942 |
| 2,391,454 | Heany | Dec. 25, 1945 |
| 2,524,601 | Riddle | Oct. 3, 1950 |
| 2,559,343 | Caton | July 3, 1951 |